May 3, 1960 G. H. FRITZINGER 2,935,370

SHEET RECORD MACHINES

Filed Dec. 28. 1955 2 Sheets-Sheet 1

INVENTOR

George H. Fritzinger

May 3, 1960 G. H. FRITZINGER 2,935,370

SHEET RECORD MACHINES

Filed Dec. 28. 1955 2 Sheets-Sheet 2

INVENTOR

George H. Fritzinger

United States Patent Office 2,935,370
Patented May 3, 1960

2,935,370

SHEET RECORD MACHINES

George H. Fritzinger, West Orange, N.J., assignor, by mesne assignments, to McGraw-Edison Company, Elgin, Ill., a corporation of Delaware Application December 28, 1955, Serial No. 555,824

13 Claims. (Cl. 346—138)

This application is a continuation-in-part of my pending application Serial No. 440,227, filed June 29, 1954, entitled Mounting of Sheet Records, which application is being abandoned upon the filing of this application.

The invention relates to a sheet record machine having a revolvable record support with an endless surface for carrying a flexible sheet record in wrap-around relation thereto. Particularly, the invention relates to improved sheet loading and ejecting apparatus adapted to enable easy loading and ejecting of sheet records while safeguarding the records from being accidentally damaged or fouled on parts of the machine during the mounting and ejecting operations.

The present invention is adapted especially for use with magnetic recording and reproducing machines which employ a thin, flexible sheet record coated with magnetizable particles and wrapped through substantially at least one full revolution around the record support with the leading edge thereof attached to the support to provide for drive of the sheet record therewith. In such machines a magnetic head is propelled slowly across the record support as the latter is rotated to cause the head to scan a helical track on the sheet with repeated crossing of the joint between the leading and trailing edges thereof. When the sheet record is removed from the support and is laid out flat, the scanning track appears as a series of side-by-side parallel lines.

It is necessary that the sheet record be placed accurately on the support so that the individual parallel lines will re-form a continuous helical track when a record sheet is mounted on a machine for playback or transcription. A satisfactory means for attaching the sheet to the support comprises a pair of hooks projecting from the surface of the support to engage a pair of complementary holes in leading corner portions of the sheet record as shown, for example, in the Roberts Patent 2,653,819, dated September 29, 1953; however, the invention is not limited in all aspects to this type of attaching means. The hooks have the advantage that when a sheet record is placed into a definite loading position, wherein the leading edge overlies the support, the hooks will pick up the sheet automatically as the support is advanced. Similarly, upon placing a stripping plate in close proximity to the support and reversely rotating the support, the sheet record is stripped from the support and disengaged automatically from the hooks.

It is important that the sheet record be in a free state at the instant it is hooked to the record support so that no tearing or distorting forces can be exerted on the leading corner portions of the record while the record is being wrapped onto the support. This is particularly important in view of the desirability of using relatively thin record sheets of only a few thousandths of an inch thickness having correspondingly reduced tear resistance. In the usual practice, the sheet record is presented manually to the machine and held in a loading position until the very instant that it is picked up by the hooks. It is however not permissible from a practical standpoint to permit the operator to keep his hand on the sheet record to the very instant that the sheet record becomes hooked to the record support in view of the limited tear resistance of the sheet material and the facts (1) that the operator cannot time his manual release at the instant the hooks engage the sheet record, and (2) he cannot reliably hold the sheet record so lightly as not to apply excessive tensioning forces to its feed into the machine which may cause the leading corner portions to be torn or distorted.

There is, however, a natural desire to maintain a definite manual control over the sheet record until it becomes attached to the record support if for no other reason than to give the operator a feeling of assurance that the sheet record will not get accidentally displaced to prevent its proper mounting. The present invention is, in one embodiment thereof, adapted to enable the operator to maintain such manual control over the sheet record without permitting him to apply resisting forces onto the sheet record, while it is being wrapped about the record support, of any such magnitude as might cause the sheet record to be torn. In another embodiment of the invention, the sheet record is safeguarded by a mounting arrangement which forces the operator to remove his hand from the record before it is drawn onto the record support.

It is accordingly an object of my invention to provide means for assuring accurate and safe mounting of thin, flexible sheet records in attached, wrap-around relation to an endless record support without requiring any special care or attention on the part of the operator while yet enabling positive control over the sheet record until it is wrapped onto the support.

It is another object to provide a sheet mounting and guide structure for causing the sheet record to be directed positively into a loading position for attachment to the record support merely by inserting the sheet record into a sheet-mounting slot.

Another object is to provide a movable sheet-record stop for locating the sheet record in loading position and means for removing the stop manually prior to attachment of the sheet record to the record support.

Another object is to provide a sheet-mounting device adapted to cause the operator to remove his hand from direct contact with the sheet record before it is attached to the record support.

Another object is to provide such sheet-mounting device with manually-operable means to cause the sheet record to be held positively in loading position but with application of a definitely limited drag resistance on the sheet record as it is driven onto the record support.

Another object is to provide for manual removal of the record stop and for manually-controlled mechanical gripping of the sheet record in one operation.

Another object is to provide novel combinations of sheet directing, locating and stripping elements adapted to facilitate the mounting and removal of sheet records onto and from an endless record-supporting surface.

Another object is to provide a sheet-mounting and stripping apparatus having separate paths for mounting and removal of the sheet records onto and from the machine.

Another object is to provide for automatic control of movable elements of a sheet-record mounting and stripping apparatus by the start-stop means for the record drive.

These and other objects and features of my invention will be apparent from the following description and the appended claims.

In the description of my invention reference is had to the accompanying drawings, of which:

Figure 1:
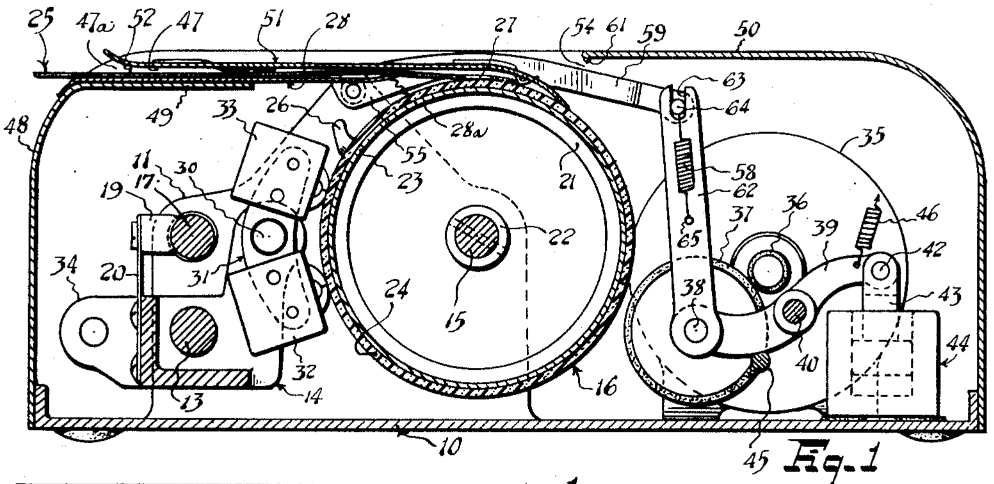
Figure 1 is a side elevation of a sheet-record recording and reproducing machine incorporating one embodiment of my invention, with parts appearing in section on the line 1—1 of Figure 2.

The sheet-record magnetic recording and reproducing machine shown in the accompanying drawings may have a base plate 10 provided with two parallel upright standards 11 and 12. These standards support a cross rod 13 for slidably supporting a carriage 14, and provide bearings for a shaft 15 carrying a rotatable record support in the shape, for example, of a drum 16, as well as bearings for a feed screw 17. The feed screw is in constant drive engagement with the shaft 15 as by means of a gear train fractionally indicated at 18. The carriage has a feed nut 19 mounted resiliently on a cantilever spring 20, which engages the feed screw to propel the carriage slowly along the drum as the latter is rotated.

The drum may comprise flanged disks 21 at its ends having hubs 22 pinned to the shaft 15, and has a tubular member 23 embracing the flanged disks and secured thereto as by welding. Covering the tube 23 is a tube 24 of resilient material such as rubber to provide a yieldable backing for a sheet record 25 when mounted thereon.

Figure 2:
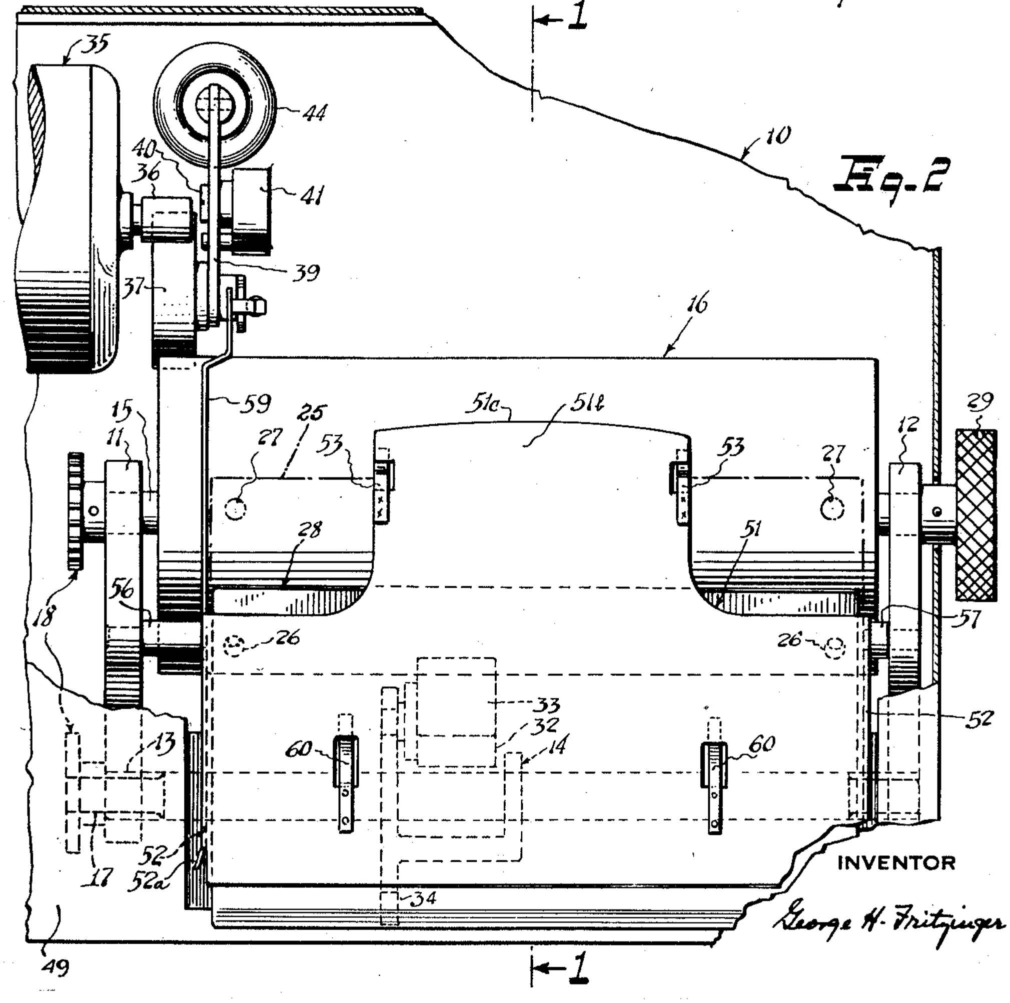
Figure 2 is a fractional top plan view of this machine with parts broken away.

The leading edge of the sheet record is attached releasably to the drum for drive of the sheet record in wraparound relation thereto with preferably a slight overlap. A preferred attaching means comprises two radial hooks 26 axially in line along the drum and positioned respectively near opposite ends thereof. The sheet record has holes 27 (Figure 2) in the leading corner portions thereof for engagement by the hooks. To mount a sheet record on the drum it is first necessary to place it in a loading position. This is done by presenting the sheet into the machine across a loading plate 28, which is tangential to the drum, until the leading edge of the sheet record overlies the drum and the holes 27 are substantially centered with respect to a radius line of the drum at right angles to the sheet (Figure 2). Thereupon, the drum is advanced as by a knob 29 on the shaft 15 to cause the hooks to engage the holes 27 and thereupon propel the sheet record around the drum, it being understood that as the drum is so advanced while the sheet record is in loading position the hooks will first deflect upwardly the leading end portion of the record and then enter the holes by the downward deflection of the sheet caused by its weight and resilient tendency to resist upward deflection.

Pivoted at 30 to the carriage 14 is a rocker beam 31 carrying an erase head 32 at one end and a record-reproduce head 33 at the other. The two heads contact the sheet record in a plane at right angles to the shaft 15 so as to ride in the same track on the record. In response to their weight and/or any torsional biasing of the carriage 14 about its support rod 30, the heads engage the sheet record 25 with the necessary pressure for establishing firm contact with the sheet record. Whenever it is desired to shift the carriage manually, it is tilted counterclockwise, as by the arm 34 extending forwardly therefrom, to disengage the heads from the sheet record or drum and to disengage the feed nut 19 from the feed screw 17. Thereupon the carriage is moved sidewise and released from its tilted position.

As the drum is advanced and the carriage is progressively moved by the feed screw 17, the heads scan a helical track on the sheet record which, when the sheet record is removed and laid out flat, appears as a series of parallel lines, as hereinbefore described.

The drum is driven by a motor 35 having a drive wheel 36 connected or geared thereto for proper driving speed. The drive wheel is coupled to the drum by a friction train comprising an intermediate drive wheel 37. This intermediate wheel is journaled at 38 to one end of a rocker 39 itself pivoted at 40 to a standard 41 extending up from the base plate 10. Pivotally connected at 42 to the other end of the rocker is the armature 43 of an electromagnet 44. The rocker is biased counterclockwise against a stop pin 45 on the standard 41 by means of a tension spring 46. Because of this biasing, the intermediate drive wheel is held normally disengaged from the drum 16 and out of pressure contact with the drive wheel 36. Upon energizing the electromagnet 44 the wheel 37 is engaged drivingly with the wheel 36 and the left end portion of the drum to impart driving movement to the latter. By way of example, one or more of the drive elements may have frictional tires of yieldable material to provide for quick start and positive drive of the drum by the drive motor.

The particular form of sheet-record machine so far described is intended primarily as an illustrative one with which my improved sheet loading and stripping apparatus is satisfactorily operable, and no unnecessary limitation thereto is therefore intended.

According to my invention, the sheet record is directed positively into loading position by means of a loading slot 47 into which the sheet record is inserted at its leading edge. The machine is preferably housed in a low, rectangular cabinet 48 and the loading slot is preferably positioned horizontally at the top of the cabinet with its opening 47 at the front of the machine and with the drum 16 positioned substantially back therefrom, preferably about midway the front and back of the cabinet, as shown. The top wall 49 of the cabinet to the front of the drum is set below the level of the top wall 50 at the rear of the drum by at least the thickness dimension of the slot loading apparatus.

The slot loading apparatus comprises the aforementioned loading plate 28 mounted on the top cabinet wall in a plane substantially tangential to the top of the drum but terminating short of the drum in a turned-up lip 28*a*. Overlying the loading plate in spaced parallel relation thereto is a guide and stripper plate 51 forming with the loading plate 28 the loading slot 47. The front edge 51*a* of the top plate 51 is curved upwardly to provide the slot with a flared opening 47*a*. The top plate 51 has flanges 52 which close the loading slot at the sides, the width of the slot in the sidewise dimension being just a little greater than the width of the sheet record to provide for accurate sidewise location of the sheet record in loading position. In order that the opening 47*a* may be substantially wider than the sheet record for easy insertion of the sheet record into the slot, the forward edges 52*a* of the side flanges are curved outwardly.

The top plate 51 has a rearwardly-extending blade portion 51*b* beyond the crest of the drum, which curves gradually downwardly to engage the drum substantially on a tangent line. By so engaging the drum, the rear edge 51*c* thereof forms a stripping element for stripping the sheet record from the drum as the drum is reversely rotated. It is to prevent the rear or trailing edge of the sheet record from getting above the loading plate 28 when the drum is so reversely rotated that the rear edge 28*a* of the loading plate is curved upwardly and terminated short of the drum as beforementioned.

The blade 51*b* of the top plate confines the sheet record closely to the drum but is made relatively narrow and positioned midway the drum lengthwise thereof to allow the opposite edges of the sheet record to be deflected upwardly by the hooks 26 as the drum is advanced to bring the hooks 26 into engagement with the holes 27 of the sheet record.

Location of the sheet record in loading position is determined at two points by respective cantilever springs 53 mounted at opposite sides of the blade 51b and contacting the drum at points spaced back from the stripping edge as with respect to the clockwise direction of advance of the drum. These springs meet the drum at acute angles substantially greater than the angle between the blade itself and the drum, this being so that they will form definite stops for the sheet record as it is inserted into the loading slot. The ends of the springs are however curved upwardly away from the drum to prevent the trailing edge of the sheet record from catching on the stop springs should reverse rotation of the drum be started while the trailing edge is between the stripping edge 51c and the stop springs.

The stop springs 53 engage the drum with light pressure so that the leading edge of the sheet can be propelled past the same when the sheet becomes attached to the drum. Thus, all the operator need do to mount a sheet record is to insert it into the loading slot as far as it will go—which is until the leading edge abuts against the stop springs—and then advance the drum by the knob 29. When it is desired to strip the sheet record, all that he must do is to reversely rotate the drum by the knob 29, for in so doing the stripping edge 51c will come below the trailing edge of the sheet record and direct the sheet record progressively outwardly of the cabinet through a slot 54 provided between the stripping edge and the top plate 51, it being understood that the forwardly curved hooks 26 become disengaged automatically as the leading edge of the sheet record rides up the stripper plate.

However, unless rather heavy and tough sheet-record material is used, it is desirable to remove any and all blocking means from the path of the leading edge of the sheet record as it is picked up by the hooks on the record support. For this reason the top plate 51 has depending ears 55 at its sides about midway its length, which are pivoted to respective studs 56 and 57 on the standards 11 and 12 respectively. The top plate is biased clockwise as seen in Figure 1 by a tension spring 58 connected to a rearwardly-extending arm 59 on the top plate, as is hereinafter more fully described. After the sheet record is inserted into the loading slot against the stop springs the operator is to press downwardly on the forward portion of the top plate to clear both the stop springs 53 and stripper edge 51c from the drum.

After the sheet record has been inserted into the loading slot, there remains the possibility of its being accidentally shifted by contact with the exposed trailing edge, especially after the stop springs are disengaged from the drum. For this reason one or more spring fingers 60 are mounted on the forward portion of the top plate to engage frictionally the sheet record in the loading slot as the forward end of the top plate is pressed downwardly, the spring fingers being however positioned so as to provide an unimpeded through-way for the sheet record when the top plate is in normal position. The tilting movement of the top plate in response to pressure exerted on the forward end portion thereof is limited by a stop member 61 to prevent the top plate itself from engaging the sheet record; however, in response to this tilting movement the spring fingers 60 engage the sheet record to hold it releasably in place. The pressure which the spring fingers 60 so apply against the sheet record has a frictional drag effect thereon which tends to tauten the sheet record as it is engaged by the hooks 26 and wrapped around the drum, but the drag resistance is insufficient to cause the holes 27 of the sheet record to be torn out. Thus the loading apparatus allows the operator to remove his hand from the sheet record and to hold it positively in place for attachment to the record support; yet, regardless of how hard he may press onto the top plate there is a limited frictional drag resistance applied to the sheet record as it is drawn onto the record support, which is insufficient to cause the sheet record to be torn during its wrapping around the drum.

It is a further feature to control the top plate 51 in accordance with the operation of the clutch for the record drive mechanism. For this purpose the arm 59 is coupled to the rocker 39 by a link 62 pivoted thereto at 38 and having an open-ended slot 63 at its one end engaged by a pin 64 on the arm 59. The spring 58 is connected between the pin 64 and a pin 65 on the link and causes the pin 64 normally to occupy a lower portion of the slot 63 with pressure of the stop springs 63 and stripping edge 51c against the drum. Whenever the electromagnet 44 is energized to engage the drive clutch, the link 62 is raised to cause abutment of the pin 64 against the inner end of the slot 63 with resultant tilting movement of the top plate 51, the same as when it is depressed manually at its forward end. Thus, the stop springs 53 and stripping edge 51c are disengaged while the drum is rotated and are re-engaged as the drum is stopped. Upon properly adjusting the tensioning of the spring 58 the engagement of the stop springs and stripping edge with the drum may serve as an effective brake on the drum as the clutch is disengaged.

As a revision of the foregoing apparatus, the spring 58 may be removed, in which case the top plate 51 may float about its pivot axis or be weight-biased preferably in a clockwise direction as seen in Figure 1. If the top plate does not seek such clockwise positioning by its weight-biasing, the operator will depress the rearward portion of the top plate until the sheet record is inserted into loading position and will depress then the forward portion while the drum is being manually rotated to wrap the sheet around the drum. Furthermore, he will depress the rearward portion of the top plate to engage the stripper edge 51c with the sheet record as he reversely rotates the drum to eject the sheet record from the machine. Of course, if desired, the top plate may be biased to an intermediate position by any suitable means not shown.

Figure 3:
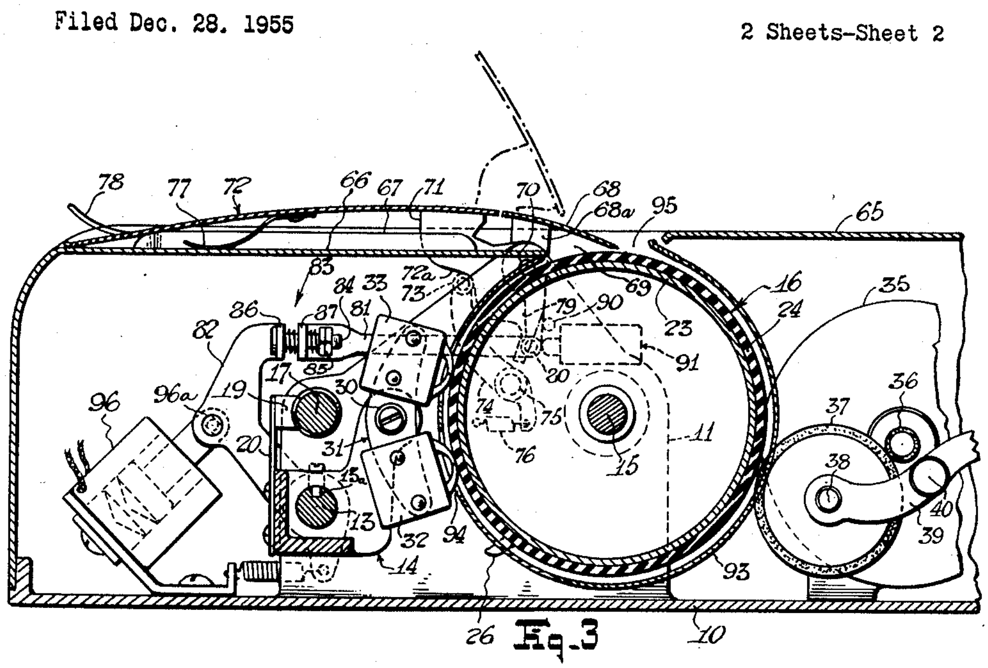
Figure 3 is a side view similar to Figure 1 but showing a sheet record machine according to a second embodiment of my invention.
Figure 4:
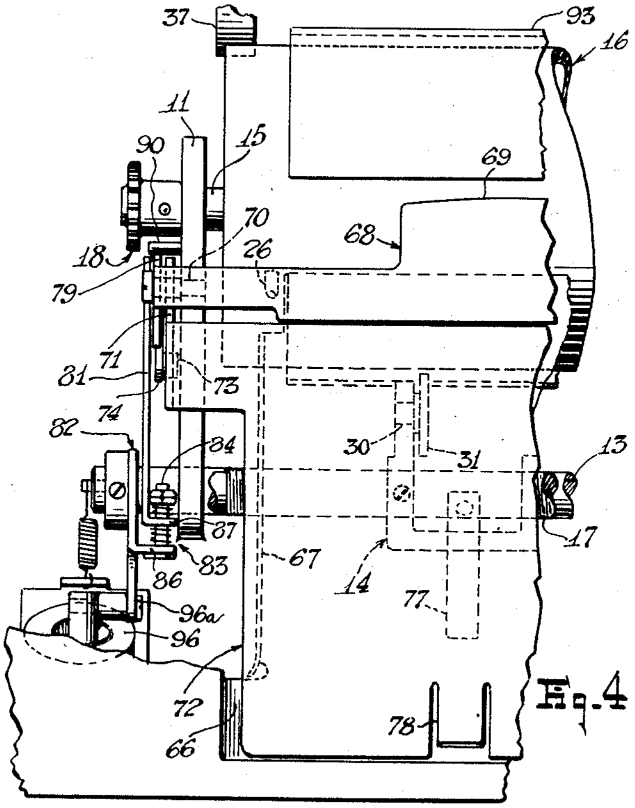
Figure 4 is a fractional plan view of a left half portion of the machine shown in Figure 3.
Figure 5:
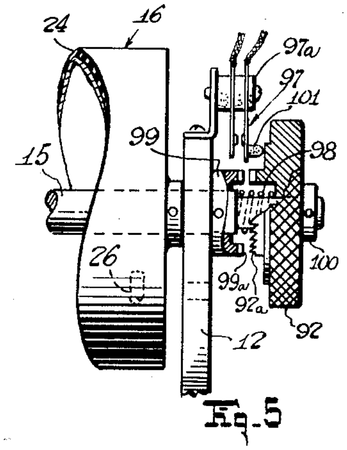
Figure 5 is a fractional view, with parts broken away, showing manual means at the right end of the record support for reversing the support.

The machine incorporating my second embodiment shown in Figures 3 to 5 is in many respects the same as that of my first embodiment, and insofar as the parts are the same and have the same function they are given the same reference characters and are not herein further described.

The cabinet 65 of this second machine differs slightly from the first in that its upper structure at the front of the drum 16 has a flat loading plate 66 leading from the forward end of the cabinet nearly to the top of the drum. This loading plate has turned-up side flanges 67 to form a channel for receiving a sheet record in proper position for loading on the drum. At the rear of the loading plate there is a guide member 68 which diverges forwardly from the top of the drum to form a nip 69 to receive the leading edge of a sheet record presented to the drum from the loading plate. This guide member has side arms 68a pivoted at 70 to the side standards to enable it to be tilted to engage and disengage its trailing edge with and from the drum. Pivoted also as at 70 are side arms 71 of a cover 72 which overlies the loading platform. The left side arm has a cam 72a engaged by a roller 73 on a lever 74 pivoted at 75 to the standard 11. The lever is spring-loaded by a tension spring 76 to urge the roller 73 against the cam, and the cam has two notches so positioned as to cause the cover to be urged downwardly when it is closed and to be detented when it is open. The closed position of the cover is determined by its abutment against the side flanges 67. This abutment is adapted to occur before the forward edge of the cover reaches the loading plate so as to leave a narrow clearance space at the front of the cover for the sheet record to extend forwardly beyond the loading plate when the cover is closed and the record is in loading position.

Mounted on the under side of the cover is a cantilever spring 77 which is adapted to press yieldably against the sheet record to hold it in place on the loading plate when the cover is closed. A raised tab 78 at the front of the cover enables the cover to be swung open to expose the loading plate for placement of a sheet record thereon.

On the left side arm 68*a* there is a depending finger 79 which is pivotally connected at 80 to a link 81. This link is connected to an actuating arm 82 on one end of the support 13 for the carriage. In order that the carriage may be rocked away from the drum by the arm 82, the carriage is splined at 13*a* to the support rod. The connection of the link to the actuating arm is by means of a yieldable coupling 83 comprising a bolt 84 having a head at one end and adjustable nuts 85 at the other end. This bolt passes through clearance holes in respective confronting lugs 86 and 87 on the arm 82 and link 81 respectively. Interposed between the lugs 86 and 87 as well as between the lug 87 and the nuts 85 are respective compression springs, as shown, to form a coupling which is yieldable in both directions. By properly adjusting the nuts 85 the tension on the springs is so set that the finger 79 is urged rearwardly against a stop pin 90 to retain the guide member 68 yieldably in an open position wherein the rear edge thereof is disengaged from the drum.

When the cover 72 is swung open, one of the side arms 71 thereof impinges against the guide member to tilt the latter rearwardly so that the rear edge thereof is pressed yieldably against the drum, it being understood that the force on the cover by the detent means before described is adapted to overpower the light spring coupling 83 which tends normally to hold the guide member open. By so engaging the rear edge of the guide member with the drum a positive stop is provided for locating the sheet record in a proper loading position as the record is thrust rearwardly from the loading plate into the nip 69.

As before described, attachment of the leading portion of the sheet record onto the hooks 26 of the drum is adapted to occur automatically as the drum is advanced. However, an advance of the drum to effect this attachment is made possible only by moving the drum by the drive motor of the machine. To safeguard against the drum being advanced while the cover is open, there is provided a drive switch 91 which is controlled by the cover. This switch—which may for instance be serially connected in the motor circuit—may be of the pushbutton type which is biased open but which is so positioned that when the cover is closed the left arm 71 thereof will operate the switch closed. Thus, the user can start the forward drive of the drum only when the cover is closed. This feature forces the user to remove his hand from the sheet record and to open the nip 69 before he can advance the drum to cause it to pick up the record; also, by providing an openable cover for the loading plate, a sheet record can be placed easily into loading position by merely laying it down onto the loading plate and sliding it rearwardly into its loading position. The invention therefore assures both easy and positive loading of sheet records without giving rise to any possibility of the user inadvertently tearing or distorting the records during the loading operation.

Record ejection is accomplished by reversing the drum as by means of a knob 92 at the right end of the shaft 15. In order that a mounted sheet record will be confined closely to the surface of the drum throughout its length especially during the record-ejecting operation, an arcuate guide plate 93 is provided from the back edge of the loading plate around the drum to a point spaced only a small distance from the back side of the guide member 68. It will be understood, however, that this guide plate has a suitable opening 94 along the length of the path of the carriage 31 to provide access of the heads to the drum. The spacing of the rear end of the guide plate from the guide member 68 is for the purpose of providing an exit 95 through which a sheet record may be ejected from the machine with the guide member 68 operating as a stripper.

To safeguard against fouling the trailing edge of the sheet record on the heads as the sheet record is ejected, a means is provided to lift the heads from the drum while the drum is being reversed. Also, this same means serves to press the guide member 68 lightly onto the drum so that it will better serve as a stripping member during the ejecting operation. This safeguarding means comprises a solenoid 96 having an armature connected at 96*a* to the actuating arm 82 for the carriage. The solenoid is normally deenergized and is controlled by a switch 97 mounted in an insulating stack 97*a* on the right standard 12. The switch is normally open but is operated closed whenever the drum is reversed by the knob 92. For instance, the knob is mounted so that it may both slide and rotate on the shaft 15 but is held yieldably in an outer position by a compression spring 98 on the shaft between the knob and an inner collar 99 pinned to the shaft, the outer position of the knob being defined by its abutment against an outer collar 100 also pinned to the shaft.

The confronting sides of the knob 92 and collar 99 have ratchet means 92*a* and 99*a* which are interchangeable by pressing the knob inwardly to enable the drum to be turned rearwardly but not forwardly by the knob. When the knob is so pressed inwardly, the inner side wall presses against an insulating stud 101 on the outer blade of the switch 97 to close the switch and energize the solenoid 95. As the solenoid is operated, it tilts the carriage 31 forwardly to disengage the heads from the drum and at the same time it draws the link 81 forwardly through the yieldable connection 83 to tilt the guide member lightly against the drum 80 so that it will operate more positively as a stripping member during the ejecting operation.

The embodiments of my invention herein particularly shown and described are intended to be illustrative and not limitative of my invention since the same are subject to changes and modifications without departure from the scope of my invention, which I endeavor to express according to the following claims.

I claim:

1. In a machine having a movable record support with an endless record-supporting surface about which a flexible sheet record is wrapped, and having means for attaching the leading edge of the sheet record to the support to provide for drive of the sheet record with the support in wrap-around relation thereto as the support is advanced: the combination of a loading plate for directing the leading edge of the sheet record onto said support; a guide member at the end of said loading plate having means engageable with said support to form a stop for locating the sheet record in a loading position for attachment to said support by said attaching means, and being inclined to said support to engage the inner side of the trailing edge of the sheet record and strip the same from the support as the support is reversely rotated; means mounting said guide member for movement into and out of engagement with said support; a movable cover plate over said loading plate in spaced relation thereto and forming an even extension of said guide member; and means for shifting said guide member relative to said support by said cover plate.

2. The combination set forth in claim 1 including spring means interposed between said cover and loading plates for releasably holding a sheet record in loading position and for slidably engaging the sheet record and applying a drag resistance thereto at a point thereon away from the record support to tauten the record as the record support is advanced to wrap the record thereon.

3. In a machine having a movable record support with an endless record-supporting surface about which a sheet record is adapted to be wrapped: the combination of guide means for directing the leading edge of the sheet record into loading position for attachment to said support; stop means against which said leading edge abuts to define said loading position; means for attaching the sheet record to said support while in said loading position; means shiftable into frictional engagement with a trailing portion of the sheet record; and means operatively intercoupling said shiftable means and said stop means for disengaging said stop means from the leading edge of the sheet record as said shiftable means is frictionally engaged with the trailing portion of the sheet record.

4. In a sheet record machine having a frame and a revolvable record support journaled on said frame and about which a flexible sheet record is adapted to be wrapped with its leading edge attached to the support: the combination of a loading plate mounted on said frame in substantially tangential relation to said support for slidably receiving a sheet record flat thereagainst and directing the leading portion of the record into lapping relation with a portion of said support; a guide member at the inner end of said loading plate adjacent to said support, means moveably mounting said guide member in inclined relation to said support to form a nip open at the end of the loading plate for receiving the leading edge of the sheet record and stopping the record in loading position; means on said support engageable with complementary means on the leading portion of a sheet record while the same is in loading position for attaching the record to said support; a movable cover for said loading plate openable to expose the plate for manual placement of a sheet record thereon into loading position and closable to force removal of the hand from the portion of the record overlying said plate; and means intercoupling said cover with said guide member for moving the latter to close said nip when the cover is open and to open the nip to permit the feed of a sheet record on said support past the guide member when the cover is closed.

5. The combination set forth in claim 4 including drive means for moving said record support in a forward direction, and means controlled by said cover for rendering said drive means inoperable when the cover is open.

6. The combination set forth in claim 4 including means for resiliently urging said cover closed and for yieldably detenting the cover in open position, said means being operative through said intercoupling means to press said guide member yieldably against the record support to close said nip while the cover is detented in open position.

7. In a sheet record machine having a frame and a revolvable record support journaled on said frame and about which a flexible sheet record is adapted to be wrapped with its leading edge attached to the support: the combination of a loading plate mounted on said frame in substantially tangential relation to said support for slidably receiving a sheet record flat thereagainst and directing the leading portion of the record into lapping relation with a portion of said support; a guide member at the inner end of said loading plate adjacent to said support; means moveably mounting said guide member in inclined relation to said support to form an open nip at the end of the loading plate for receiving the leading edge of the sheet record and holding the record in a loading position; means on said support engageable with complementary means on the loading portion of the record in loading position for attaching the record to said support; said guide member having a back side facing away from the record support and inclined thereto; a guide structure extending in spaced relation to said support from a point at said inner end of said loading plate around said support in the direction of reverse movement thereof to a point spaced from said back side of said guide member to confine a mounted sheet record in close proximity with said support, said guide structure diverging from said support in spaced relation to said back side of said guide member to provide an exit through which a sheet record is ejected, with said back side of the guide member operating as a stripping member, when the record support is reversed.

8. The combination set forth in claim 7 including means for yieldably tilting said guide member into stripping engagement with said record support when the support is reversed.

9. The combination set forth in claim 7 including a record-cooperating head urged yieldably against the record on said support; a manual member on the shaft of said support for turning the support in a reverse direction to eject the record therefrom; and means responsive to reverse rotation of said support by said manual member for shifting the head away from the record support.

10. In a machine having a revolvable record support with an endless record-supporting surface about which a rectangular sheet record is adapted to be wrapped with the leading edge attached to said support: the combination of means for releasably attaching the leading edge of the sheet record to said support to provide for wrap-around of the sheet record onto the support as the support is advanced; a record-cooperating head biased yieldably against the record on said support; means for stripping a sheet record from said support as the support is reversed; a rotatable knob shiftable into engagement with said support for manually reversing said support; and means responsive to the shifting of said rotatable knob into engagement with said support for lifting said head from the support.

11. The combination set forth in claim 3 including drive means having control means operable to start and stop advance movement of said support; and means coupling said stop means to said control means for causing the stop means to be rendered effective and ineffective respectively as said record support is stopped and started.

12. The combination set forth in claim 3 wherein said stop means comprises a movable element shiftable into engagement with said support to serve as a means for stripping the sheet record from the support when the record support is reversed; a drive mechanism for advancing said support including control means for starting and stopping said advance movement; and means coupling said control means to said movable stripper element for disengaging the latter from the record support while the record support is being advanced by said drive mechanism.

13. The combination set forth in claim 3 wherein said guide means comprises a top plate mounted for pivotal movement about a central axis transverse of the machine, said guide plate being biased about said axis, wherein said stop means comprises an element on the rear-end portion of said top plate engageable with said record support under influence of said biasing for locating the sheet record in loading position when inserted into said guide means, said top plate being tiltable in a reverse direction to disengage said stop means from said support, and wherein said shiftable means comprises spring means on a forward portion of said top plate engageable with the sheet record as the top plate is reversely tilted to hold the sheet record releasably in loading position and with application of a drag resistance on the sheet record as the sheet record is wrapped onto said support.

References Cited in the file of this patent

UNITED STATES PATENTS

| | | |
|---|---|---|
| 998,663 | Wood | July 25, 1911 |
| 2,431,360 | Philpott | Nov. 25, 1947 |
| 2,653,819 | Roberts | Sept. 29, 1953 |
| 2,664,988 | Metzner | Jan. 5, 1954 |
| 2,695,785 | Dashiell et al. | Nov. 30, 1954 |
| 2,698,183 | Lang | Dec. 28, 1954 |
| 2,865,637 | Roberts et al. | Dec. 23, 1958 |